(12) United States Patent
Lee et al.

(10) Patent No.: US 7,574,242 B2
(45) Date of Patent: Aug. 11, 2009

(54) PORTABLE TERMINAL HAVING REPLACEABLE MODULES

(75) Inventors: Woo-Ram Lee, Yongin-si (KR); Sang-Min Hyun, Seoul (KR); Chang-Soo Lee, Incheon (KR)

(73) Assignee: Samsung Electronics Co., Ltd (KR)

( * ) Notice: Subject to any disclaimer, the term of this patent is extended or adjusted under 35 U.S.C. 154(b) by 410 days.

(21) Appl. No.: 11/356,689

(22) Filed: Feb. 15, 2006

(65) Prior Publication Data

US 2006/0234785 A1    Oct. 19, 2006

(30) Foreign Application Priority Data

Mar. 16, 2005    (KR) ...................... 10-2005-0021803

(51) Int. Cl.
*H04M 1/00*    (2006.01)
*H04B 1/08*    (2006.01)
*H04B 1/38*    (2006.01)

(52) U.S. Cl. ................ 455/575.1; 455/575.4; 455/90.1; 455/348

(58) Field of Classification Search ................... 455/90, 455/575.4, 575.1, 348; 345/206; 361/679.32
See application file for complete search history.

(56) References Cited

U.S. PATENT DOCUMENTS 6,463,263 B1 * 10/2002 Feilner et al. .............. 455/90.1
2002/0039890 A1 * 4/2002 Kim ............................ 455/90
2003/0090480 A1 * 5/2003 Polgar et al. ................ 345/206
2005/0014538 A1 * 1/2005 Hyun et al. .............. 455/575.4

FOREIGN PATENT DOCUMENTS

EP       1 220 367        7/2002
KR    10-2002-0014143    2/2002

* cited by examiner

Primary Examiner—Charles N Appiah
Assistant Examiner—Kiet Doan
(74) Attorney, Agent, or Firm—The Farrell Law Firm, LLP

(57) ABSTRACT

Disclosed is a portable terminal having replaceable accessory modules. An accessory module can be rigidly mounted using a frame of the portable terminal, and can be easily replaced with another module according to a user's selection to satisfy various consumer demands. The portable terminal includes a body, accessory modules which are selectively mounted to the body, for providing additional functions to the portable terminal, and a movable frame which is mounted to and slides along the body of the portable terminal to keep the selected accessory module fixed to the body of the portable terminal by enclosing the selected accessory module to be mounted to the body of the portable terminal, for preventing the selected accessory module from being separated from the body of the portable terminal.

13 Claims, 7 Drawing Sheets

PORTABLE TERMINAL HAVING REPLACEABLE MODULES

PRIORITY

This application claims priority to an application entitled "Mobile Phone with Replaceable Module" filed with the Korean Intellectual Property Office on Mar. 16, 2005 and assigned Serial No. 2005-21803, the contents of which are incorporated herein by reference.

BACKGROUND OF THE INVENTION

1. Field of the Invention

The present invention relates to a portable terminal, and more particularly to a portable terminal having a variety of replaceable accessory modules each having a specific function, such as a camera module and a Bluetooth communication module, which a user can selectively replace with another in consideration of its use.

2. Description of the Related Art

In general, "a portable terminal" means an electronic device which a user can carry with him/her while communicating with another user. In consideration of portability, the design of such a portable terminal has tended to consider not only compactness, slimness and lightness, but also toward providing multimedia capabilities to allow the user to pursue a wider variety of functions. In particular, future portable terminals will not only be used for many functions while still being compact and light, but will also be modified to be suitable for functioning in a multimedia environment and for providing Internet access and functions. Additionally, such portable terminals may be used by men and women, young and old, anywhere in the world.

Conventional portable terminals may be classified into various types according to their appearance, such as bar-type portable terminals, flip-type portable terminals, and folder-type portable terminals. The bar-type portable terminal has a single housing shaped like a bar. The flip-type portable terminal has a flip panel which is pivotably mounted to a bar-shaped housing by a hinge unit. The folder-type portable terminal has a folder coupled to a single bar-shaped housing by a hinge unit in such a manner that the folder can be rotated in order to be folded towards or unfolded from the housing.

Further, portable terminals may be classified as neck wearable type terminals and wrist wearable type terminals, according to the position at or the way in which a user wears the terminal. The neck wearable type terminal is one which a user wears around the neck using a lanyard or necklace, while the wrist wearable type terminal is one which a user wears around the wrist.

Additionally, portable terminals may be classified as rotation-type (or swing-type terminals and sliding-type terminals according to the ways of opening and closing the terminals. In the rotation-type portable terminal, two housings are coupled to each other in a manner that one housing rotates to be opened or closed relative to the other while facing each other. In the sliding-type portable terminal, two housings are coupled to each other in a manner that one housing slides to be opened or closed relative to the other. The various classifications of portable terminals are easily understood by those skilled in the art.

In addition, various portable terminals have been developed to satisfy gradually increasing consumer demands. For example, a portable terminal including camera lens to perform a photography function, a portable terminal having stereo speakers to listen to stereo music, a portable terminal having a TV receiver, and a portable terminal having a game function have been manufactured.

Since the conventional portable terminals as above mentioned have a specific structure to accommodate their respective use, there is a problem in that it is impossible, or at least, inconvenient to use them for purposes other than their main use. Where the portable terminal having the specific function of playing music is used to play a game, for example, the game is played by using the common keys provided on the dial pad. Thus, it causes game play to be difficult, resulting in a reduction in the user's enjoyment. Therefore, there is a disadvantage in that the conventional portable terminal is typically replaced with a portable terminal having a reinforced game function to smoothly play games.

There currently is a portable terminal to which a user can directly mount a camera module having a camera lens to the earphone outlet to take a picture of a subject. However, there are problems in that any external impact may cause the camera module to be easily separated from the portable terminal. Also, it is inconvenient to use the camera module due to the weak connection between the camera module and the portable terminal.

SUMMARY OF THE INVENTION

Accordingly, the present invention has been made to solve the above-mentioned problems occurring in the prior art, and an object of the present invention is to provide a portable terminal having replaceable modules to permit an accessory module to be rigidly mounted using a frame of the portable terminal.

Another object of the present invention is to provide a portable terminal having replaceable modules which can be easily mounted to the portable terminal and easily replaced with another module according to a user's selection.

Still another object of the present invention is to provide a portable terminal having replaceable modules so as to satisfy various consumer demands.

In order to accomplish these objects, there is provided a portable terminal having replaceable accessory modules, which includes a body; accessory modules which are selectively mounted to the body for providing additional function to the portable terminal; and a movable frame which is mounted to and slides along the body of the portable terminal to keep the selected accessory module fixed to the body of the portable terminal and which is provided for enclosing the selected accessory module to be mounted to the body of the portable terminal for preventing the selected accessory module from being separated from the body of the portable terminal.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the present invention, a detailed description of known functions and configurations incorporated herein is omitted to avoid making the subject matter of the present invention unclear.

Figure 1:
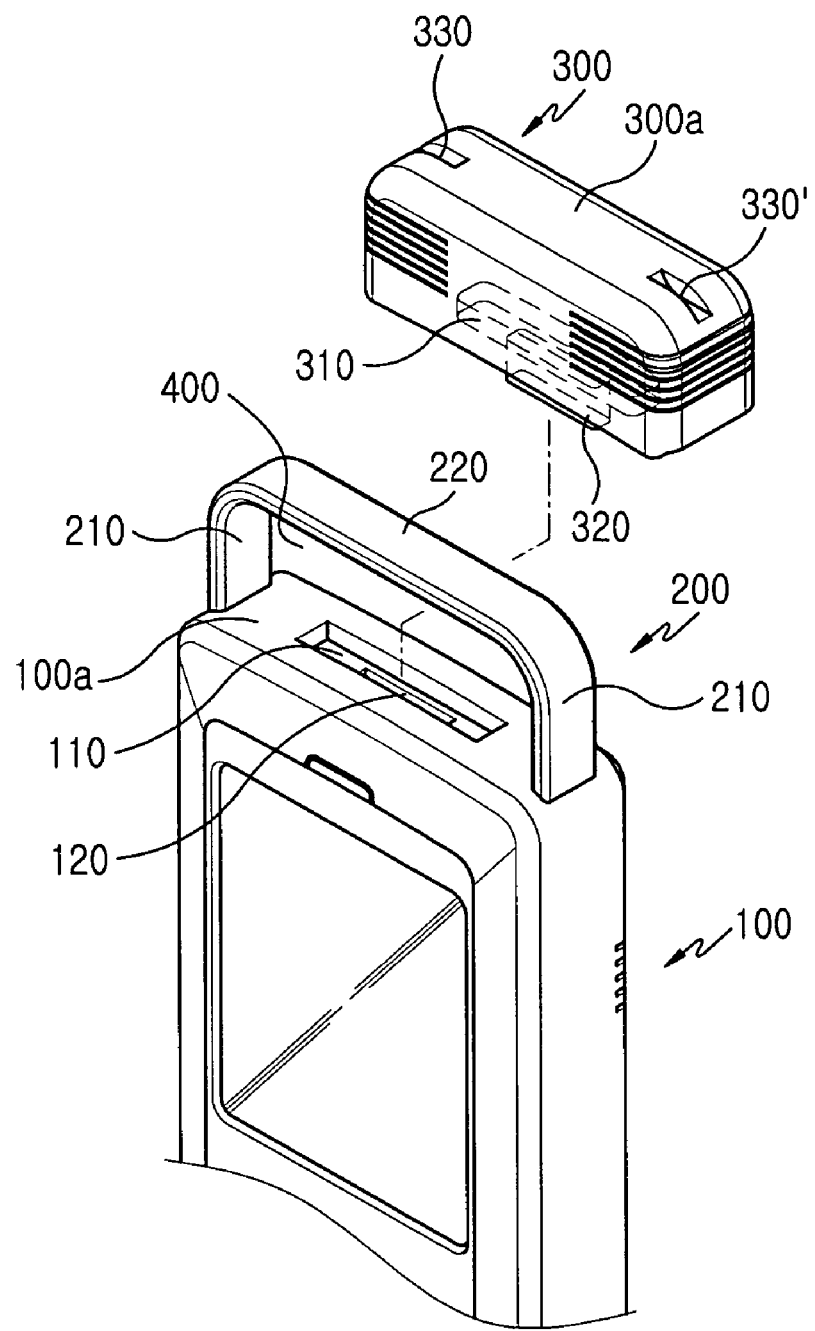
FIG. 1 is an exploded perspective view showing a portable terminal according to a preferred embodiment of the present invention.

As shown in FIGS. 1 to 4, the portable terminal according to the present invention includes a body 100, accessory modules 300 which are selectively mounted to the body 100 in order to provide additional functions to the portable terminal, and a movable frame 200 which is mounted to and slides along the body 100 of the portable terminal to keep the selected accessory module 300 fixed to the body 100 of the portable terminal and which is provided for enclosing the selected accessory module 300 when it is mounted to the body 100 of the portable terminal, for preventing the mounted accessory module 300 from being separated from the body 100 of the portable terminal. Furthermore, the portable terminal may include a first holding device which is provided on the body 100 of the portable terminal and the movable frame 200 to keep the selected accessory module 300 fixed to the body 100 of the portable terminal. In addition, the portable terminal may include a second holding device which is provided on the body 100 of the portable terminal and the accessory module 300 to keep the accessory module 300 connected to the body 100 of the portable terminal. While the present invention is shown in FIG. 1 as being applied to a bar-type portable terminal, it will be understood by those skilled in the art that the present invention can be applied to a flip-type portable terminal, a folder-type portable terminal, a slider-type portable terminal, a swing-type portable terminal and the like.

Figure 2:
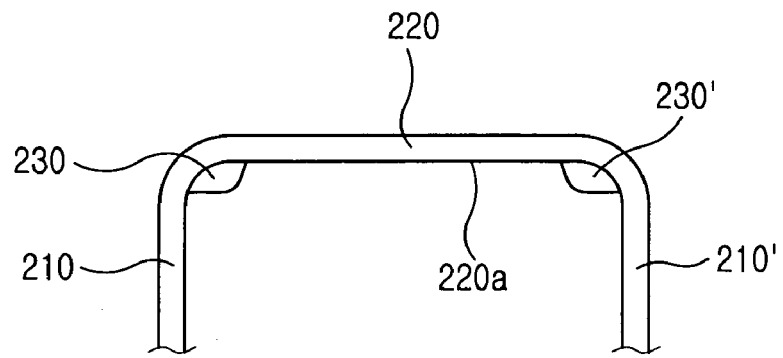
FIG. 2 is a front view showing a movable frame of the portable terminal according to the preferred embodiment of the present invention.

Referring to FIGS. 1 and 2, the movable frame 200 includes a pair of guide frames 210 and 210' and a pressing frame 220. A space 400 is provided between the body 100 of the portable terminal and the movable frame 200. The pair of guide frames 210 and 210' have a distance corresponding to the width of the accessory module 300 positioned between them, of which a lower end is received in the body 100 of the portable terminal to be coupled to a guide rail (not shown). The guide rail assists the guide frames 210 and 210' to slide straight so that the guide frames 210 and 210' protrudes and retracts with respect to an upper surface 100a of the body 100 of the portable terminal. On the other hand, the pressing frame 220 is integrated with the pair of the guide frames 210 and 210' to connect upper ends of the guide frames 210 and 210' to each other and moves the guide frames 210 and 210' together. As the pressing frame 220 moves the guide frames 210 and 210' together, the accessory module 300 may be fixed to or released from the body 100 of the portable terminal. That is, the accessory module 300 can be coupled to or separated from the body 100 of the portable terminal when the movable frame 200 completely protrudes with respect to the upper surface 100a of the body 100 of the portable terminal, while the accessory module 300 is fixed to the body 100 when the movable frame 200 is retracted to press against that the accessory module 300 which is mounted to the body 100. When the movable frame 200 is completely retracted after the accessory module 300 is removed, the movable frame 200 is partially received in the body 100 of the portable terminal to prevent a connection terminal 120 from being filled with debris such as dust.

The first holding device includes a plurality of projections 230 and 230', and a plurality of grooves 330 and 330' corresponding to the projections 230 and 230'. The projections 230 and 230' extend inwardly from an inner surface 220a of the movable frame 200, while the grooves 330 and 330' are formed on an outer surface 300a of the accessory module 300 to correspond to the projections 230 and 230'. The projections 230 and 230' engaged with the grooves 330 and 330' when the accessory module 300 is fixed to the body 100 by means of the movable frame 200. Therefore, the first holding device can effectively deal with load applied in front and rear directions to the accessory module 300 which is mounted to the body 100 of the portable terminal, resulting in keeping the accessory module 300 fixed to the body 100 of the portable terminal. Preferably, the projections 230 and 230' are formed at both ends of the inner surface of the pressing frame 220 and the grooves 330 and 330' are formed at both ends of the upper surface of the accessory module 300.

The second holding device includes a seat groove 110 and a projection 310. The seat groove 110 is formed at a desired depth on the upper surface 100a of the body 100 of the portable terminal, while the projection 310 is formed on a bottom surface of the accessory module 300 to correspond to the seat groove 110. The projection 310 is inserted in and associated with the seat groove 110 when the accessory module 300 is mounted to the body 100 of the portable terminal. Thus, the second holding device can keep the accessory module 300 rigidly fixed to the body 100 of the portable terminal.

Figure 3:
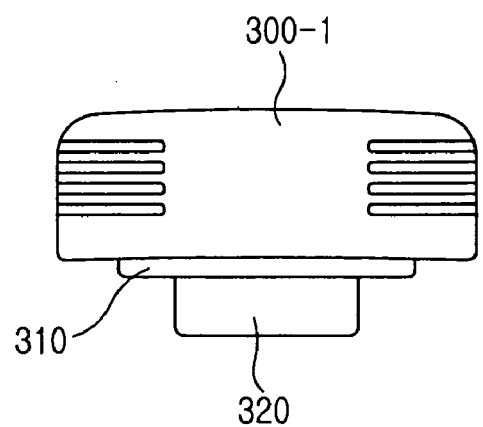
FIG. 3 is a front view showing a module of the portable terminal according to the preferred embodiment of the present invention.
Figure 4:
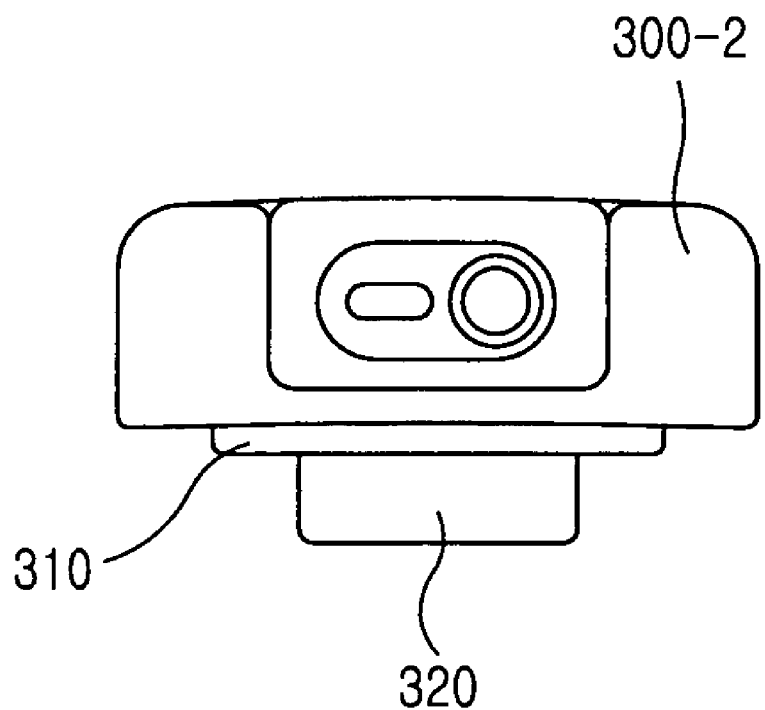
FIG. 4 is a front view showing another module of the portable terminal according to the preferred embodiment of the present invention.
Figure 5A:
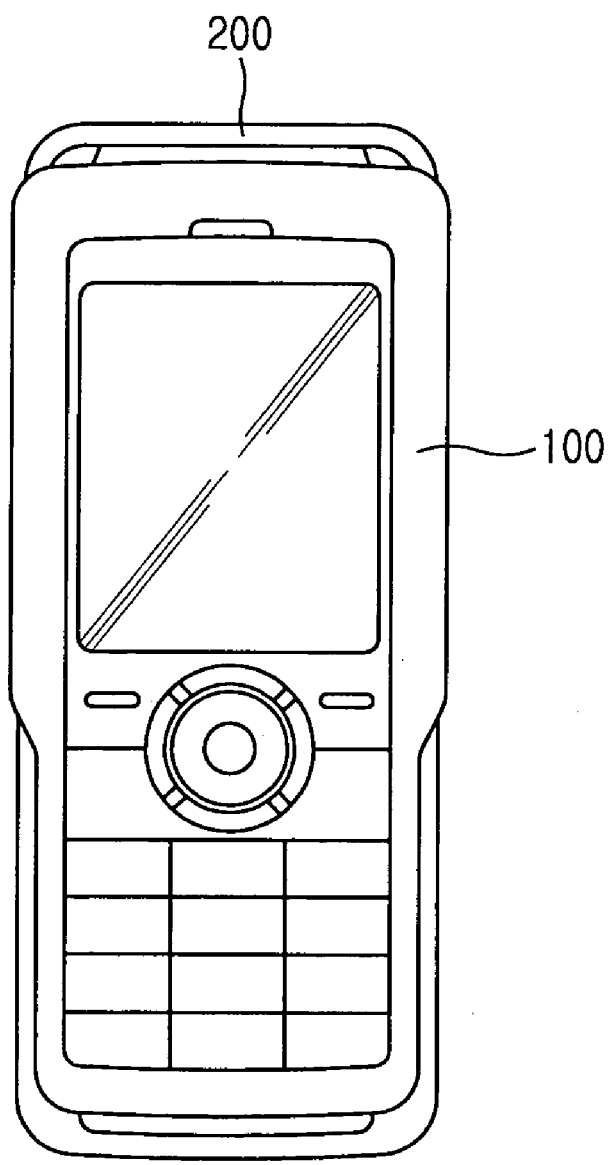
FIGS. 5A to 5D are views showing a process of mounting the module to the portable terminal according to the preferred embodiment of the present invention.
Figure 5B:
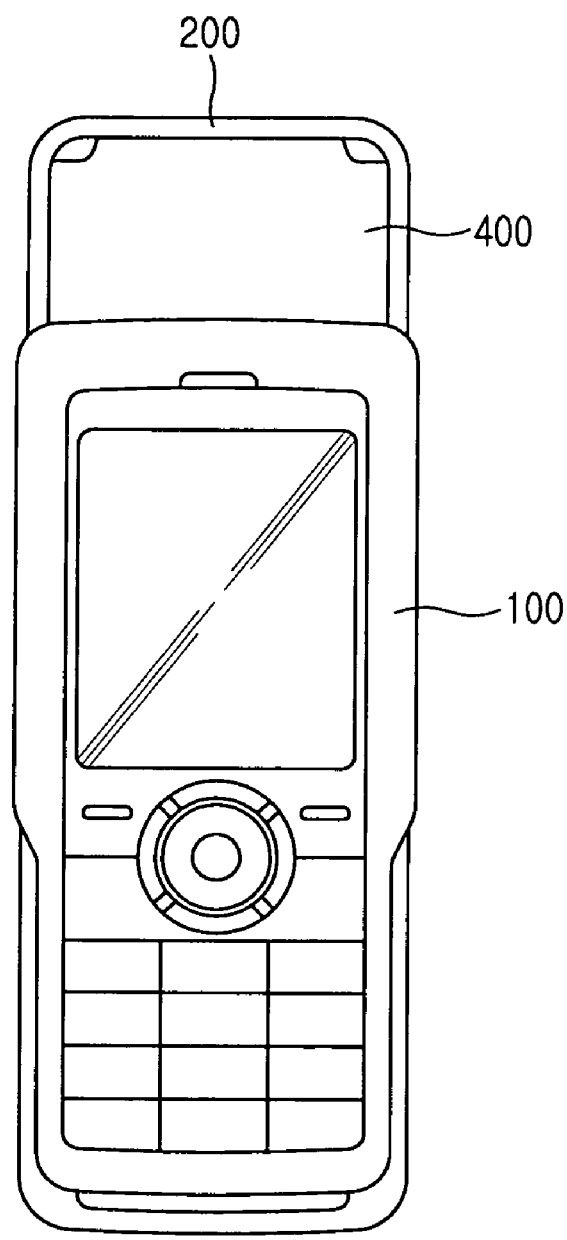
Figure 5C:
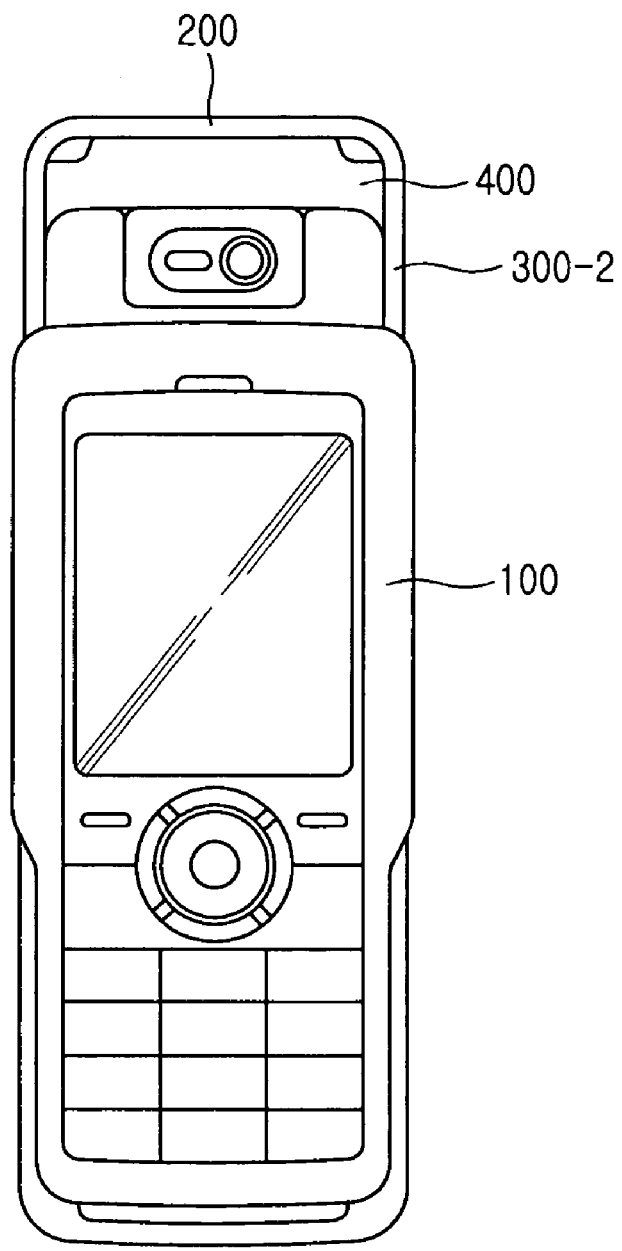
Figure 5D:
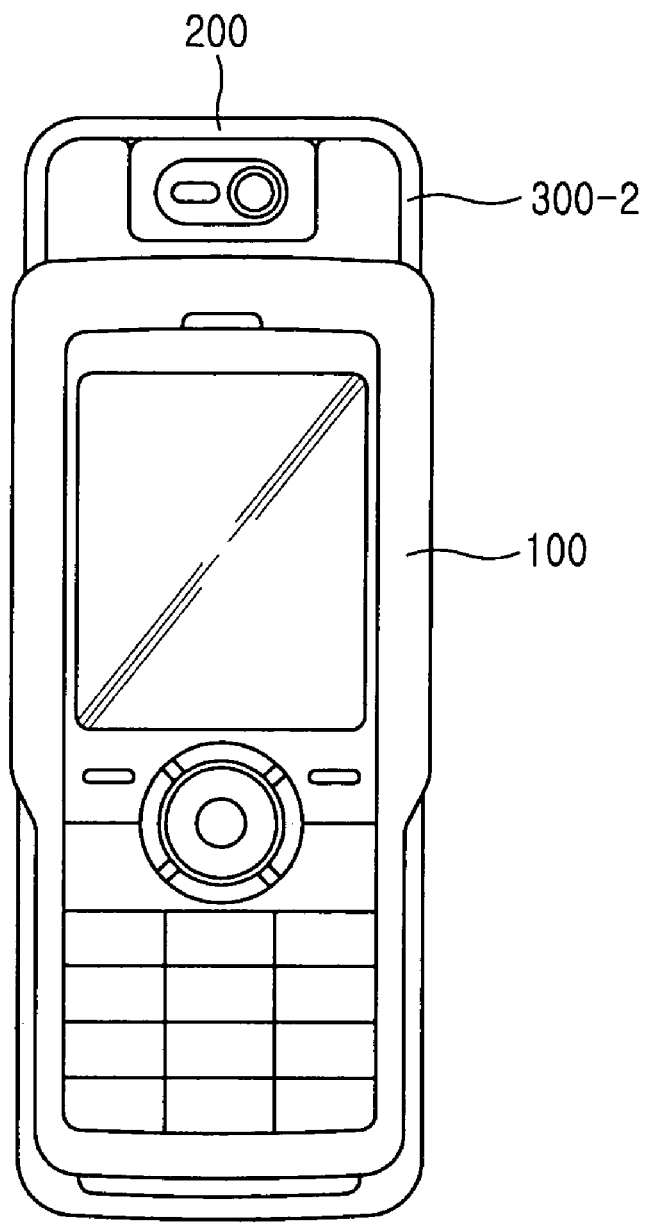

The body 100 and the accessory module 300 are respectively provided with the connection terminal 120 and a connector 320 to transmit and receive data and signals to/from each other. The connection terminal 120 is provided inside the seat groove 110 and the connector 320 is formed on a bottom of the projection 310. The connector 320 is coupled to the connection terminal 120 at the same time as the projection 310 is inserted into the seat groove 110. As shown in FIGS. 3 and 4, the accessory module 300 can include a module such as a speaker module 300-1, a camera module 300-2 and a Bluetooth communication module to perform additional functions other than the basic functions provided to the portable terminal. The speaker module 300-1 contains speaker(s) giving sound. The camera module 300-2 has a camera lens to take pictures. The Bluetooth communication module facilitates communication with a computer, a terminal and other appliances placed within a short distance using radio frequencies to enable real time communication. FIG. 3 shows the speaker module 300-1 and FIG. 4 shows the camera module 300-2. The accessory modules 300-1 and 300-2 include the projection 310 which is inserted in the seat groove 110 formed in the body 100 and the connector 320 which is coupled to the connection terminal 120 in the seat groove 110.

FIGS. 5A to 5D are views showing a process of mounting the camera module 300-2 used as the accessory module 300 to the body 100 of the portable terminal.

Referring to FIGS. 5A to 5D, the user pulls straight up on the movable frame 200 disposed on the upper side 100a of the body 100 of the portable terminal so as to extend the movable frame 200 outward when mounting the camera module 300-2 to the body 100. Preferably, the movable frame 200 slides along the longitudinal direction of the body 100.

When the user extends the movable frame 200, the space 400 between the upper side 100a of the body 100 and the inner surface 200a of the movable frame 200 becomes wider. The camera module 300-2 is mounted through the widened space 400 to the body 100. After the camera module 300-2 is placed in the space 400, that is, the camera module 300-2 is mounted to the body as the projection 310 of the camera module 300-2 is inserted into the seat groove 110 formed in the body 100 of the portable terminal. At that time, the connector 320 of the camera module 300-2 is coupled to the connection terminal 120 of the body 100 of the portable terminal.

As the user pushes the movable frame 200 toward the camera module 300-2, the process of mounting the camera module 300-2 is completed. As a result, the movable frame 200 rigidly fixing the camera module 300-2 to the body 100 envelopes the outer surface of the camera module 300-2.

Since the user can selectively mount accessory modules having additional functions to the body of the portable terminal, as described above, the user facilitates realization of a specialized portable terminal. The portable terminal of the present invention can satisfy the consumer demands. In addition, since it improves the unity of the body and the accessory module, it not only helps the user to use the portable terminal intuitively but also protects the accessory module from separation and damage.

While the invention has been shown and described with reference to certain preferred embodiments thereof, it will be understood by those skilled in the art that various changes in form and details may be made therein without departing from the spirit and scope of the invention as defined by the appended claims. For example, the movable frame may be a pivotable with respect to the body of the terminal, so that it pivots from the position shown in FIG. 5D to allow connection/disconnection of the accessory module.

What is claimed is:

1. A portable terminal having replaceable accessory modules, the portable terminal comprising:
   a body;
   at least one accessory module which is selectively mountable to the body, for providing additional function to the portable terminal; and
   a movable frame which is mounted to the body of the portable terminal to keep the at least one accessory module rigidly fixed to the body of the portable terminal, and which surrounds the at least one accessory module when it is mounted to the body to prevent the at least one accessory module from being separated from the body, the movable frame including a pair of guide frames which are received at one end thereof in the body of the portable terminal and outwardly extend at the other end thereof from the body of the portable terminal to maintain a distance corresponding to a width of the accessory module and a pressing frame which extends between the other ends of the guide frames to connect the guide frames to each other, for pressing an upper side of the accessory module when the accessory module is mounted to the body of the portable terminal.

2. The portable terminal as claimed in claim 1, wherein a space is provided between the body of the portable terminal and the movable frame, in which the accessory module is disposed.

3. The portable terminal as claimed in claim 1, further comprising a first holding device provided between the accessory module and the movable frame to keep the accessory module fixed to the body of the portable terminal.

4. The portable terminal as claimed in claim 3, wherein the first holding device includes a plurality of projections extending from an inner surface of the movable frame toward the body of the portable terminal and a plurality of grooves formed in the accessory module to be engaged with a corresponding projection.

5. The portable terminal as claimed in claim 4, wherein the first holding device includes two projections which project from both ends of the inner surface of the movable frame and two grooves which are formed at both ends of an upper side of the accessory module to correspond to the two projections.

6. The portable terminal as claimed in claim 3, further comprising a second holding device provided between the body of the portable terminal and the accessory module to keep the accessory module connected to the body of the portable terminal.

7. The portable terminal as claimed in claim 6, wherein the second holding device includes a seat groove which is formed on an upper side of the body of the portable terminal and a projection which extends from a bottom surface of the accessory module to be fixedly inserted in the seat groove.

8. The portable terminal as claimed in claim 1, wherein the accessory module is mounted on an upper side of the body of the portable terminal.

9. The portable terminal as claimed in claim 1, wherein the movable frame slides in a longitudinal direction of the body of the portable terminal.

10. The portable terminal as claimed in claim 1, wherein the accessory module is one of a camera module, a Bluetooth communication module and a speaker module.

11. The portable terminal as claimed in claim 1, wherein the movable frame is mounted to the body of the portable terminal to enclose an external surface of the accessory module.

12. The portable terminal as claimed in claim 1, wherein the movable frame is slideably mounted to the body of the portable terminal.

13. The portable terminal a claimed in claim 1, wherein the movable frame is pivotably mounted to the body of the portable terminal.

* * * * *